(12) United States Patent
Srinivasan et al.

(10) Patent No.: US 7,712,073 B1
(45) Date of Patent: May 4, 2010

(54) SOFTWARE DEVELOPMENT ARTIFACT CREATION TOOL

(75) Inventors: Lavanya Srinivasan, Overland Park, KS (US); Courtlan M. Telford, Overland Park, KS (US); Nalledath P. Vinodkrishnan, Overland Park, KS (US); Cong Xu, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 863 days.

(21) Appl. No.: 10/744,170

(22) Filed: Dec. 23, 2003

(51) Int. Cl.
*G06F 9/44* (2006.01)

(52) U.S. Cl. .................. 717/104; 717/101; 717/105; 717/120

(58) Field of Classification Search .................. None
See application file for complete search history.

(56) References Cited

U.S. PATENT DOCUMENTS

| | | | | |
|---|---|---|---|---|
| 6,101,502 | A * | 8/2000 | Heubner et al. | 707/103 R |
| 6,442,748 | B1 * | 8/2002 | Bowman-Amuah | 717/108 |
| 6,598,219 | B1 * | 7/2003 | Lau | 717/108 |
| 6,601,234 | B1 * | 7/2003 | Bowman-Amuah | 717/108 |
| 6,671,680 | B1 * | 12/2003 | Iwamoto et al. | 707/3 |
| 7,137,100 | B2 * | 11/2006 | Iborra et al. | 717/106 |
| 2004/0031030 | A1 * | 2/2004 | Kidder et al. | 717/172 |
| 2005/0076328 | A1 * | 4/2005 | Berenbach et al. | 717/104 |
| 2005/0108684 | A1 * | 5/2005 | Sohn et al. | 717/120 |
| 2005/0197954 | A1 * | 9/2005 | Maitland et al. | 705/39 |

OTHER PUBLICATIONS

Rational, "Toolset Guide—Rational Rose Real Time—Version: 2002.05.00", 2001, Rational Software Corporation, pp. 1-433.*
Rational Software Corporation, "Rational Rose 2000e Rose Extensibility User's Guide", Mar. 2000, Revision 7.0, pp. 1-152.*
Aubonnet et al., "PILOTE: A Service Creation Environment in Next Generatin Networks", 2001 IEEE, pp. 36-40.*
Kudrass et al., "Rule-Based Generation of XML DTDs from UML Class Diagrams", Sep. 17, 2003, Springer, pp. 339-354.*
Kovse et al., "Generic XMI-Based UML Model Transformations", 2002 Springer, pp. 192-198.*
Data Access Technologies, "Enterprise Distributed Object Computing (EDOC) Model Driven Architecture (MDA) Solution Provisioning Environment (SPE)", Aug. 10, 2003, Data Access Technologies, pp. 1-13.*
Süβ et. al., "Model-Centric Engineering with the Evolution and Validation Environment", Oct. 2, 2003, Springer Berlin/Heideberg, pp. 31-43.*
Object Management Group, "Meta Object Facility (MOF) Specification", Apr. 2002, OMG, pp. 1-358.*

* cited by examiner

*Primary Examiner*—Michael J Yigdall
*Assistant Examiner*—Ben C Wang

(57) ABSTRACT

A system and method for engineering data into interface control documents is provided. The method includes creating and loading an interface control document by selecting features of an interface control document to create, providing a standards document having interface control document standards, and providing a case tool for maintaining interface control documents. The method provides for generating the interface control document using the standards document and based upon the selected features, and storing the interface control document in the case tool. The method includes designating a document having data attributes for the interface control document, reading at least some of the data attributes from the document, loading at least some of the data attributes read from the document into the interface control document, and storing the interface control document having at least some of the data attributed in the case tool.

16 Claims, 3 Drawing Sheets

SOFTWARE DEVELOPMENT ARTIFACT CREATION TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software design tools, and more particularly, but not by way of limitation, to a system and method for creating software development artifacts.

BACKGROUND OF THE INVENTION

Development of quality enterprise software, for example, software which is employed by large corporations to conduct operations, is a complicated task. Many organizations have evolved standardized processes for developing software in order to achieve consistency and predictability in their software development activities. This consistency and predictability effect how much time it takes to develop the software and how robust and reliable the software is.

Typically a software development process produces intermediate products or artifacts along the path to producing the finished software product. Production of these artifacts serves to provide a sense of direction to the software developers. The software developers are instructed what content and level of detail the artifacts are expected to contain. Creating the artifact according to these expectations compels the software developer to work through specific issues of the software development and hence defines a sequence and direction to the software development work. The artifacts serve as an excellent basis to share technical information among software developers, testers, and managers. Often the software development process employs reviews of the in-progress software development to decide whether the work has matured sufficiently to advance to the next stage in the software development cycle or whether more work is required. The artifacts capture the current maturity and completeness of software development and provide visibility into the status of the software development to reviewers.

A variety of names for software artifacts are employed by different companies. Often a given artifact name means different things to software development teams in different companies. Some of the typical artifacts are briefly described below.

Requirements documents define functional requirements that the finished software is expected to satisfy. Sometimes requirements are divided into high level or customer requirements and into low level, derived, or engineering requirements.

Use cases are brief textual descriptions of a business operation at a high level. They are intended to capture the nature of a single business operation from the view of the end user and not the view of the technologist developing the software.

Message sequence diagrams, also referred to as sequence diagrams, may be employed to capture inter-module or inter-application communication sessions. These diagrams indicate the participants in the communication session, the senders and the receivers of each communication, the content of each communication, and the sequence of the communications. The communications may be termed messages.

Interface documents define the interface between different modules, systems, or applications. Such documents may define the communication technology employed, for example, sockets, message queues, Java remote method invocation (RMI), transmission control protocol (TCP), and ethernet. They may define the structure of the information communicated in terms of bit sequences, byte sequences, and fields. They may define the valid values or valid range of values and the meanings of values which may be communicated. They may define a mandatory message sequence, or handshake, for establishing a communication link, for exchanging information, and for terminating the communication link. Sometimes these documents are called interface control documents (ICDs).

High level design documents (HLDs) and low level design documents (LLDs) are comprehensive documents which may contain any of the preceding information. Additionally, HLDs and LLDs typically provide a narrative text description of design which is not a normal part of the other artifacts. HLDs provide less detail than LLDs. The definition of what information belongs in a HLD versus what information belongs in a LLD differs from one software development organization to another. Some software development organizations produce only HLDs and no LLD. Some software development orgnaizations do not produce either HLDs or LLDs, but capture the information with other artifacts.

Software development tools have been created to aid software developers to develop software and to encourage them to follow and adhere to the software development process. These tools may provide editors for quick construction and revision of message sequence diagrams, interface documents, and other documents. These tools may perform rules checking between development artifacts, for example, to validate that the accepted software development process is adhered to, to discover shortcomings in a given artifact. Some software development tools may be sold or leased as off-the-shelf software from software vendors. These off-the-shelf software development tools may provide means to extend their capabilities and to customize their behavior to accommodate the needs of a specific software development organization. Some of these tools may be referred to as computer aided software engineering (CASE) tools.

Software development tools may impose specific structures on the information captured in the artifacts, and the structures may be different from one specific software development tool to another software development tool. An incompatibility between software artifacts produced using different software development tools may cause difficulties when modifying existing software. For example, if software which was developed using tool A now needs to be modified using tool B, the developer may need to manually translate the software artifacts associated with the software being modified from the structure associated with tool A to the structure associated with tool B. This incompatibility between software artifacts produced using different software development tools may cause similar problems when two intercommunicating systems are developed using different software development tools, which may happen when systems are developed by different branches of one company.

SUMMARY OF THE INVENTION

A system and method for engineering data into interface control documents is provided. The method includes creating and loading an interface control document by selecting features of an interface control document to create, providing a standards document having interface control document standards, and providing a case tool for maintaining interface control documents. The method provides for generating the interface control document using the standards document and based upon the selected features, and storing the interface control document in the case tool. The method includes designating a document having data attributes for the interface control document, reading at least some of the data attributes from the document, loading at least some of the data attributes read from the document into the interface control document, and storing the interface control document having at least some of the data attributed in the case tool.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
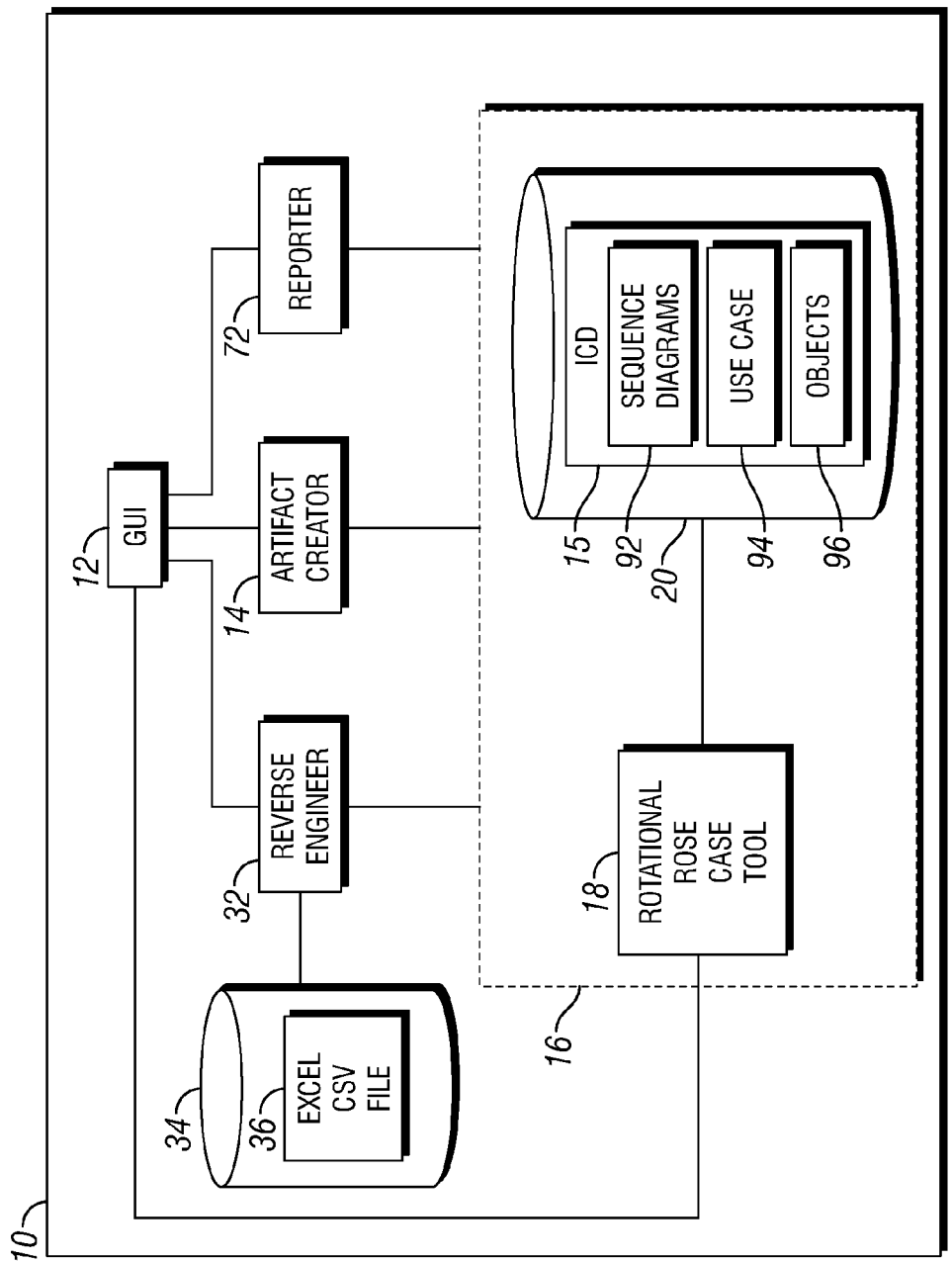
FIG. 1 is a block diagram of a software artifact creation system according to the preferred embodiment.

Turning now to FIG. 1, a block diagram of an artifact builder system 10 is depicted. A graphical user interface (GUI) 12 is in communication with an artifact creator module 14 and is operable to invoke the functions of the artifact creator module 14 and to control an operational session with the artifact creator module 14. In the preferred embodiment, the GUI 12 is an extension of a computer aided software engineering (CASE) tool sold under the trademark Rational Rose® that is accessible under an add-in manager (AIM) menu selection under a tools toolbar option.

The artifact creator module 14 is operable to receive inputs from the GUI 12 and to create a software artifact 15 in accordance with the commands or messages received from the GUI 12. The software artifact 15, which the artifact creator module 14 creates, contains no data associated with a specific software product, but has a structure appropriate to the software product under development. In some embodiments the software artifact 15 may have multiple distinct components, sections, or separate files which the artifact creator module 14 initializes and establishes. In the preferred embodiment, the software artifact is an interface control document (ICD) and may contain a use case 94, one or more sequence diagrams 92, and an object model 96 comprising multiple object attributes. A use case 94 is a brief textual description of a use of a software system from the viewpoint of a user of the system. A sequence diagram 92 represents the messages exchanged by several components of a software system and the sequence of these messages. The software artifact 15 in the preferred embodiment is a file with the .mdl file extension usable with products sold under the trademark Rational Rose®. The .mdl file is structured into components, for example, the sequence diagram 92, the use case 94, and the object model 96, by adding configuration attributes into the .mdl file.

The software artifact structure may be defined by a template or baseline artifact file, accessible to the artifact creator module 14, which identifies the parts or components which are to form a part of the software artifact. As such, the template or baseline artifact file may contain a list of standard components. For example, the template file may list the use case, the sequence diagram, and the object model as components of the software artifact 15. Use of the template to identify the structure of the software artifact 15 helps to enforce software process standards and reduces review-revision cycles, because the artifact creator module 14 automatically sets-up the software artifact 15 in standard form as specified by the template file. Using the template to identify the structure of the software artifact 15 also reduces the learning that a new developer must accomplish to become a productive member of a development team, because the new developer need not read a lengthy process document which defines the format of the software artifact 15 before getting to work building and filling the software artifact 15.

The artifact creator module 14 writes the created software artifact 15 to a software artifact repository 16 which is operable to store and retrieve the software artifact 15. In the preferred embodiment, the software artifact repository 16 comprises a software development tool 18, specifically a CASE tool sold under the trademark Rational Rose®, in communication with a first store 20 which physically stores the software artifact 15 as a file. In other embodiments, the software artifact repository 16 may be a code control system (CCS). In still other embodiments, the software artifact repository 16 may be a file system or a database. The template or baseline artifact file discussed above may also be stored in the software artifact repository 16.

The GUI 12 is in communication with a reverse engineering module 32 and is operable to invoke the functions of the reverse engineering module 32 and to control an operational session with the reverse engineering module 32. The reverse engineering module 32 is in communication with a second store 34 containing data 36 and is also in communication with a software artifact repository 16 which stores the software artifact 15. The reverse engineering module 32 is operable to read the data 36 from the second store 34 and to write this data 36 into the software artifact 15 stored in the software artifact repository 16.

In the preferred embodiment, the data 36 comprises a CSV file produced by the spreadsheet program sold under the trademark Microsoft® Excel® having columns defined for the name of analysis model structure, the conceptual name of attribute, the attribute documentation, and the attribute data type. Every row in the CSV file has a value for each column, and every row defines an object attribute. An object attribute is a variable holding information relevant to the object. For example, a customer object may include attributes for last name, first name, address, phone number, and others. The data 36 may be exported by another software development tool. The reverse engineering module 32 imports these attributes into the object model 96 forming part of the software artifact 15. The reporter module 72 exports the software artifact 15 in a CSV format compatible with spreadsheet programs sold under the trademark Microsoft® Excel® for use by other software development tools. An example of the data 36 may be as follows:

| Structure Name | Attribute Name | Description | Data type |
|---|---|---|---|
| Analysis_ISA_Network_Info | IP_ADR | IP Address to connect | String |
| Analysis_ISA_Network_Info | RSRC_NME | Name assigned net node | String |
| Analysis_ISA_Network_Info | ALT_IP_ADDR | Alternate IP Address | String |

A reporter module 72 is operable to receive inputs from the GUI 12 directing it to export the contents of the software artifact 15 in a comma separated value (CSV) format amenable to importing into other software development tools. This feature supports communication among design groups which use different, otherwise incompatible software development tools 18.

A typical application of the artifact builder system 10 is to create the software artifact 15 by using the artifact creator module 14 and to then populate the software artifact 15 with information based on transforming the data 36 read from the second store 34 by using the reverse engineering module 32. The data 36 may be a software artifact generated by a different software development tool, and the data 36 may be incompatible with the software development tool 18 without the transformations effected by the reverse engineering module 32.

Figure 2:
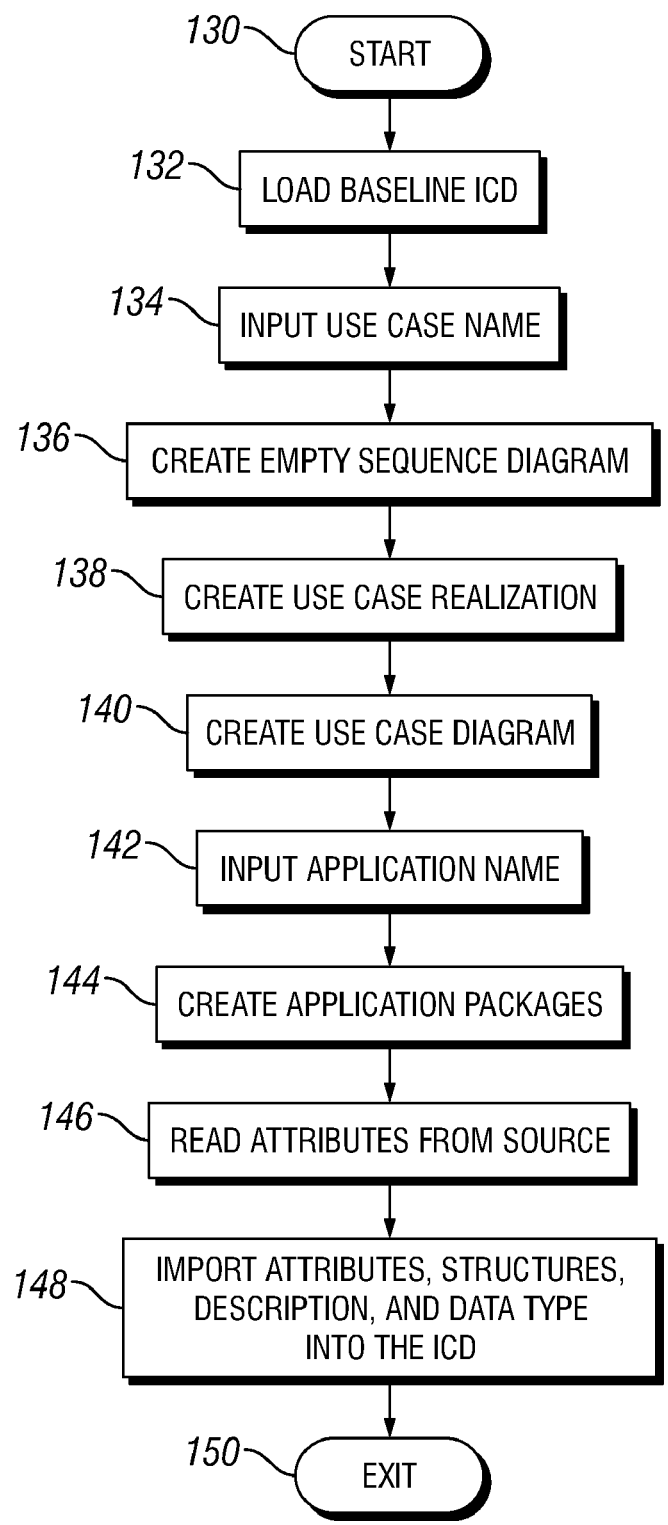
FIG. 2 is a flow chart of a method of creating software artifacts employing the software artifact creation system.

Turning now to FIG. 2 a flow chart depicts the steps or process of using the software artifact creation system 10. The process begins at block 130 and proceeds to block 132 where a baseline ICD template or definition is loaded into the artifact creator module 14. This baseline ICD definition defines what components belong to the software artifact 15 and may vary from project to project. The process proceeds to block 134 in which a name is specified for creating the use case 94 and associated components of the software artifact 15. The process proceeds to block 136 in which an empty sequence diagram 92 is created and named based on the use case name. The process proceeds to block 138 in which an empty use case realization is created and named based on the use case name. The process proceeds to block 140 in which an empty use case 94 is created and given the name specified in block 134. The process flows to block 142 in which a name is specified for an application name. The process flows to block 144 in which application packages are created. Note that the above describes an exemplary baseline ICD according to one baseline ICD template or definition. When other baseline ICD templates or definitions are employed more or fewer ICD components may be created. Also note that creating these components of the software artifact 15 comprises adding configuration attributes to the .mdl file, as discussed above.

The process flows to block 146 in which data attributes are read from the data 36, embodied as a CSV file compatible with spreadsheet programs sold under the trademark Microsoft® Excel®. The process flows to block 148 in which the attributes read from the second store 34 are imported as attributes, structures, descriptions, and data types into the software artifact 15. The process flows to block 150 where the process completes and exits.

Note that while in the above exemplary process the software artifact 15 is created and then populated from transformed data or attributes read from a CSV file compatible with spreadsheet programs sold under the trademark Microsoft® Excel®, in some uses the software artifact 15 is created and then populated manually by the software developers. The software developers are likely to populate the software artifact 15 when first developing software while using the software development tool 18. The processing blocks 146 and 148 are employed when transforming data or attributes placed in a CSV file by a software development tool different from then software development tool 18. For example, when transforming data or attributes placed in a CSV file by a spreadsheet program sold under the trademark Microsoft® Excel® for use in a software development tool sold under the trademark Rational Rose®.

Figure 3:
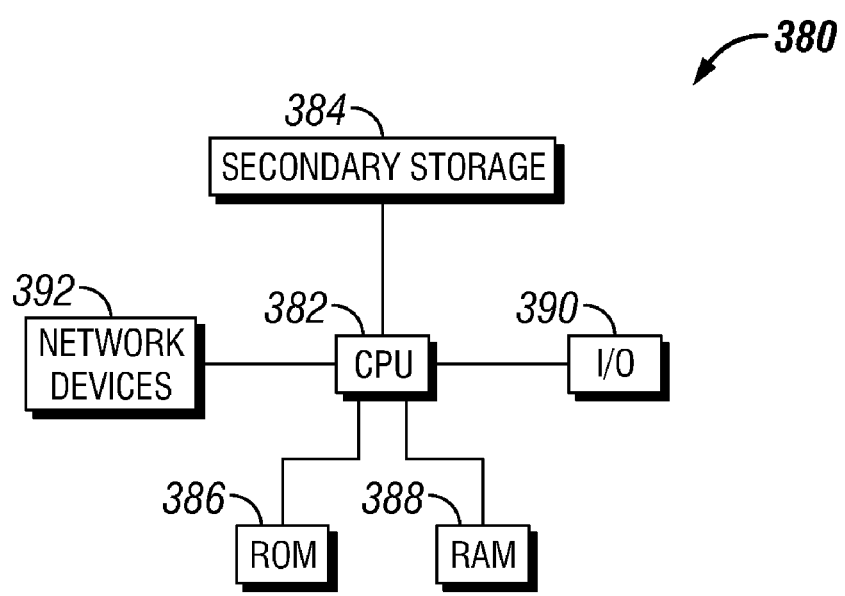
FIG. 3 illustrates an exemplary general purpose computer system suitable for implementing the several embodiments of the software artifact creation system.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed:

1. A system for engineering data into interface control documents, comprising:
   a processor;
   a user interface of a first software development tool that designates a source file containing source data elements to engineer into a destination interface control document, wherein the each of the source data elements include a structure name portion, an attribute name portion, a documentation portion maintaining a description of the data element, and a data type portion;
   a template interface control document maintaining a list of standard interface control document components for one or more projects, the list of standard interface control document components including a standard use case component, a standard sequence diagram component, and a standard object model component;
   wherein the user interface further receives a selection of standard components of the template interface control document to include in a structure of the destination interface control document;
   a generator module comprising instructions stored on a computer-readable storage medium that when executed by a processor communicates with the user interface and generates the destination interface control document that defines one or more of a communication technology employed, a structure of information communicated, or a mandatory message sequence, wherein the structure of the destination interface control document comprises an empty structure, and wherein the structure of the destination interface control document is compatible with the first software development tool and includes one or more of a use case component, a sequence diagram component, and data attributes component that includes multiple attributes, each of the multiple data attributes including a structure name portion, an attribute name portion, a documentation portion maintaining a description of the data attribute, and a data type portion, and wherein the source file is an artifact of a second software development tool and wherein the first software development tool and the second software development tool are incompatible;
   a repository that stores the destination interface control document as an mdl file type, wherein the mdl file type is a modeling file in a proprietary format compatible with the first software development tool; and
   a conversion module comprising instructions stored on a computer-readable storage medium that when executed by a processor reads the source data elements from the source file designated via the user interface, transforms the read source data elements from a format compatible with the second software development tool to a format compatible with the first software development tool, and writes the transformed source data elements into the structure of the destination interface control document, wherein the conversion module stores the destination interface control document having at least some of the source data elements in the first software development tool.

2. The system of claim 1, wherein source file is further defined as a comma separated value file.

3. The system of claim 1, wherein the first software development tool is a computer aided software engineering tool.

4. The system of claim 1, wherein the source file is a comma separated value file and wherein each of a plurality of data lines of the source file define a data element.

5. The system of claim 4, wherein the source file includes a column for a structure name, a column for the name of the data element, a column for a description of the data element, and a column defining a data type of the data element.

6. The system of claim 1, further comprising:
   a second conversion module that exports contents of an interface control document to a second file, wherein the source file and the second file have a same format.

7. A method for creating and loading an interface control document, comprising:
   selecting features of a destination interface control document to generate, wherein the destination interface control document defines one or more of a communication technology employed, a structure of information communicated, or a mandatory message sequence;
   providing a template document having a list of standard interface control document components;
   providing a computer aided software engineering tool for maintaining interface control documents;
   generating the destination interface control document defining a structure using one of the standard interface control document components from the template document that correspond with the selected features, wherein the structure of the destination interface control document is empty and the structure is compatible with the computer aided software engineering tool;
   storing the destination interface control document as an mdl file type in the computer aided software engineering tool, wherein the mdl file type is a modeling file in a proprietary format compatible with the computer aided software engineering tool;
   designating a source document having source data elements for the destination interface control document, wherein each of the source data elements include a structure name portion, an attribute name portion, a documentation portion maintaining a description of the data element, and a data type portion, and where the source document is an artifact of a software development tool that is incompatible with the computer aided software engineering tool;

reading at least some of the data elements from the source document;

transforming the read data elements from a format compatible with the software development tool to a format compatible with the computer aided software engineering tool;

loading the transformed data elements into the structure of the destination interface control document; and storing the destination interface control document having at least some of the data elements in the computer aided software engineering tool.

8. The method of claim 7, wherein the source document is a comma separated values file containing at least some of the data elements for the destination interface control document.

9. The method of claim 7, wherein the features comprise at least one use case artifact and at least one application artifact.

10. The method of claim 7, wherein the transforming and the loading of the data elements includes writing object attributes into the destination interface control document by importing structure names, attribute names, descriptions, and data types based on the data elements read from the source document.

11. The method of claim 7, further comprising:
inputting a use case name related to the interface control document;
creating a use case realization related to the use case name; and
creating a use case diagram related to the use case name.

12. A computer-readable storage medium storing a program that, when executed by a processer, causes the processor to:
select features of a destination interface control document to generate, wherein the destination interface control document defines one or more of a communication technology employed, a structure of information communicated, or a mandatory message sequence;
provide a template document having a list of standard interface control document components;
provide a computer aided software engineering tool for maintaining interface control documents;
generate the destination interface control document defining a structure using one of the standard interface control document components from the template document that correspond with the selected features, wherein the structure of the destination interface control document is empty and the structure is compatible with the computer aided software engineering tool;
store the destination interface control document as an mdl file type in the computer aided software engineering tool, wherein the mdl file type is a modeling file in a proprietary format compatible with the computer aided software engineering tool;
designate a source document having source data elements for the destination interface control document, wherein each of the source data elements include a structure name portion, an attribute name portion, a documentation portion maintaining a description of the data element, and a data type portion, and where the source document is an artifact of a software development tool that is incompatible with the computer aided software engineering tool;
read at least some of the data elements from the source document;
transform the read data elements from a format compatible with the software development tool to a format compatible with the computer aided software engineering tool;
load the transformed data elements into the structure of the destination interface control document; and
store the destination interface control document having at least some of the data elements in the computer aided software engineering tool.

13. The computer-readable storage medium of claim 12, wherein the source document is a comma separated values file containing at least some of the data elements for the destination interface control document.

14. The computer-readable storage medium of claim 12, wherein the features comprise at least one use case artifact and at least one application artifact.

15. The computer-readable storage medium of claim 12, wherein when the processor transforms and loads the data elements the program causes the processor to write object attributes into the destination interface control document by importing structure names, attribute names, descriptions, and data types based on the data elements read from the source document.

16. The computer-readable storage medium of claim 12, wherein the program further causes the processor to:
input a use case name related to the interface control document;
create a use case realization related to the use case name; and
create a use case diagram related to the use case name.

* * * * *